(12) United States Patent
Sajeepa (10) Patent No.: US 9,917,800 B2
(45) Date of Patent: Mar. 13, 2018

(54) SYSTEM AND METHOD FOR CENTRALIZED VIRTUAL INTERFACE CARD DRIVER LOGGING IN A NETWORK ENVIRONMENT

(75) Inventor: Prabhath Sajeepa, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 865 days.

(21) Appl. No.: 13/594,132

(22) Filed: Aug. 24, 2012

(65) Prior Publication Data

US 2014/0059195 A1   Feb. 27, 2014

(51) Int. Cl.
   *G06F 15/167*   (2006.01)
   *H04L 12/861*   (2013.01)
   *H04L 29/06*    (2006.01)

(52) U.S. Cl.
   CPC ...... *H04L 49/9063* (2013.01); *H04L 63/1425* (2013.01)

(58) Field of Classification Search
   CPC . G06F 9/45537; G06F 15/167; H04L 63/1425
   USPC ........................................................ 709/223
   See application file for complete search history.

(56) References Cited

U.S. PATENT DOCUMENTS

| | | | |
|---|---|---|---|
| 6,907,419 B1 * | 6/2005 | Pesola .................. | G06F 11/0727 |
| 6,948,004 B2 | 9/2005 | Gasbarro et al. | |
| 7,711,789 B1 * | 5/2010 | Jnagal .................. | G06F 3/0605 |
| | | | 709/213 |
| 7,831,749 B2 | 11/2010 | Pope et al. | |
| 2005/0172162 A1 * | 8/2005 | Takahashi ........... | G06F 11/0709 |
| | | | 714/4.4 |
| 2006/0195675 A1 * | 8/2006 | Arndt et al. .................. | 711/200 |
| 2009/0141719 A1 * | 6/2009 | Roy ...................... | H04J 3/0685 |
| | | | 370/390 |
| 2011/0119673 A1 | 5/2011 | Bloch et al. | |
| 2012/0093035 A1 * | 4/2012 | Kidambi ............. | H04L 49/3054 |
| | | | 370/255 |
| 2012/0246303 A1 * | 9/2012 | Petersen ........... | G06F 17/30185 |
| | | | 709/224 |

OTHER PUBLICATIONS

Manoj Wadekar, et al., "DCB Capability Exchange Protocol Base Specification," Rev. 1.0 (2008), 29 pages, [retrieved and printed from http://www.ieee802.org/1/files/public/docs2008/az-wadekar-dcbx-capability-exchange-discovery-protocol-0608-v1.0.pdf].

R. Gerhards, "The Syslog Protocol," Network Working Group, RFC 5424, Mar. 2009, 39 pages; http://tools.ietf.org/pdf/rfc5424.pdf.

* cited by examiner

*Primary Examiner* — Kevin Bates
*Assistant Examiner* — Chen-Liang Huang
(74) *Attorney, Agent, or Firm* — Polsinelli PC (57) ABSTRACT

A method is provided in one example and includes creating a staging queue in a virtual interface card (VIC) adapter firmware of a server based on a log policy; receiving a log message from a VIC driver in the server; copying the log message to the staging queue; generating a VIC control message comprising the log message from the staging queue; and sending the VIC control message to a switch.

20 Claims, 6 Drawing Sheets

SYSTEM AND METHOD FOR CENTRALIZED VIRTUAL INTERFACE CARD DRIVER LOGGING IN A NETWORK ENVIRONMENT

TECHNICAL FIELD

This disclosure relates in general to the field of communications and, more particularly, to a system and a method for centralized Virtual Interface Card (VIC) driver logging in a network environment.

BACKGROUND

Data centers are increasingly used by enterprises for effective collaboration and interaction and to store data and resources. A typical data center network contains myriad network elements, including servers, load balancers, routers, switches, etc. The network connecting the network elements provides secure user access to data center services and an infrastructure for deployment, interconnection, and aggregation of shared resource as required, including applications, servers, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes generating a staging queue in a virtual interface card (VIC) adapter firmware of a server based on a log policy; receiving a log message from a VIC driver in the server; copying the log message to the staging queue; generating a VIC control message comprising the log message from the staging queue; and sending the VIC control message to a switch. In this context, the term 'generating' can include any activity associated with creating, forming, formulating, or otherwise providing an element. In addition, the term 'copying' in this context can include any type of replication (in part or in full), duplication, modifying, editing, etc.

In more particular embodiments, the log policy can be associated with at least one of a service profile of the server and a port profile of a virtual interface instantiation on the server in a network environment. The log message can be copied to a descriptor copy work queue at the VIC driver, and wherein the log message is copied to the staging queue from the descriptor copy work queue.

In yet other embodiments, the method can include posting a completion queue entry in a completion queue at the VIC driver; and interrupting the VIC driver to notify of transmission of the log message to the switch. The VIC control message includes a log message type, and a corresponding Type-Length-Value (TLV) according to a Virtual Interface Control protocol. In other example implementations, the method can include updating a log location, log level, and throttling option according to a log policy update; and interrupting the VIC driver such that the VIC driver can change a logging level according to the log policy update. The log policy update can be transmitted to the VIC adapter firmware in an update message comprising the log location, the log level, and the throttling option. The switch can evaluate the log policy, and determine an action to be taken based on the log message. The action can include: a) sending a syslog message to a syslog server; b) notifying an administrator; or c) sending notification to one or more devices.

EXAMPLE EMBODIMENTS

Figure 1:
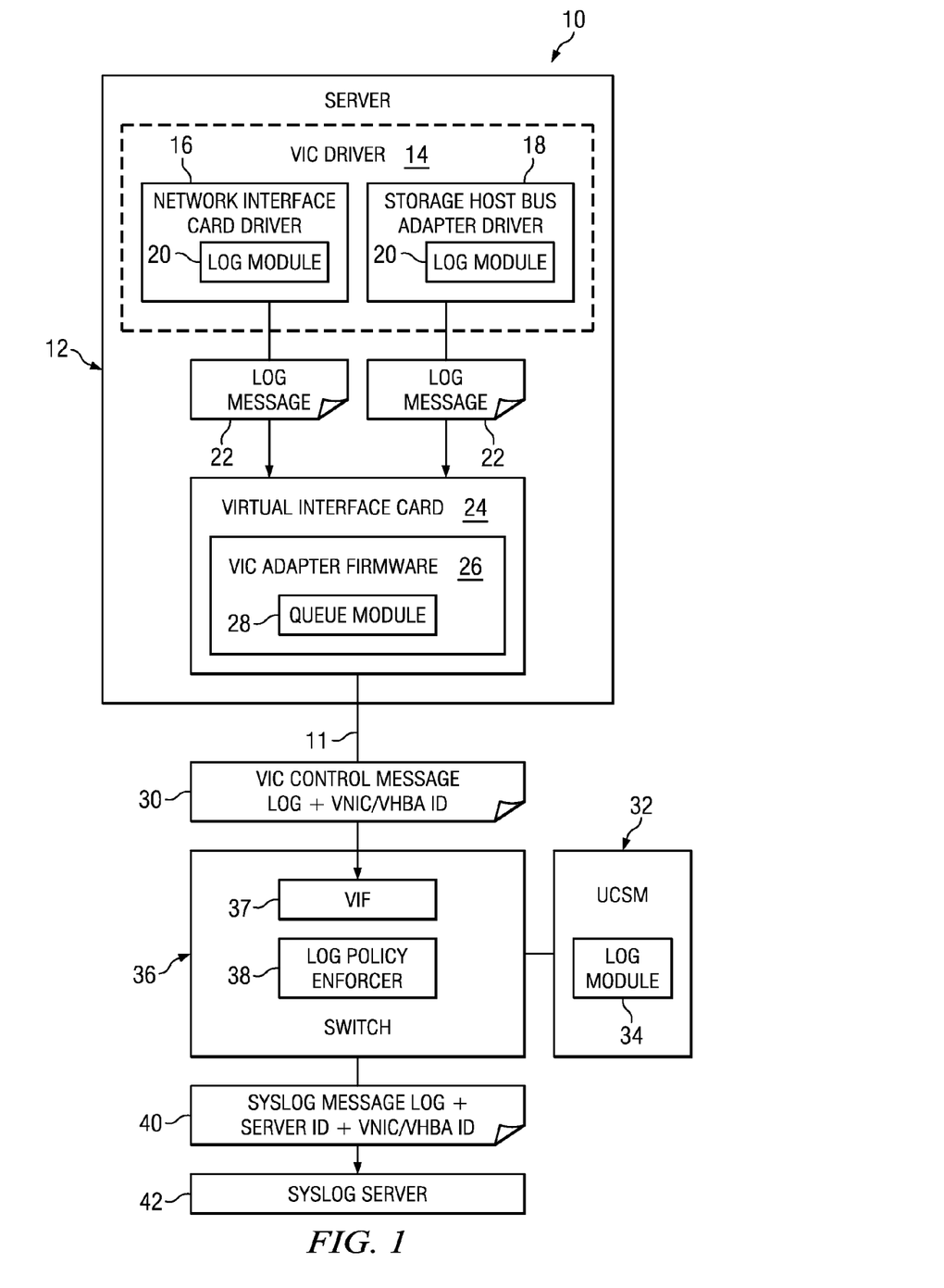
FIG. 1 is a simplified block diagram illustrating an embodiment of a communication system for centralized VIC driver logging in a network environment.

Turning to FIG. 1, FIG. 1 is a simplified block diagram illustrating a communication system 10 for centralized VIC driver logging in a network environment. Communication system 10 includes a network 11 with a server 12 having a VIC driver 14 that can communicate with a VIC 24. As used herein, the term "VIC driver" can encompass a software program that can control: (i) network communication between VIC 24 and server 12; and (ii) communication between remote storage devices and server 12. VIC driver 14 can include a network interface card driver 16 and a storage host bus adapter driver 18 for controlling network communication and storage device communication respectively.

A log module 20 in network interface card driver 16 and storage host bus adapter driver 18 may facilitate creation of one or more log message 22 by network interface card driver 16 and storage host bus adapter driver 18. As used herein, the term "log message" can include any text and/or alphanumeric data (including strings) containing contextual information about a specific event at server 12. The term "event" is inclusive of occurrences, actions, and errors. Examples of events may include failure of a bootup process, invalid login attempts, and network connectivity issues. VIC 24 in server 12 may be provisioned with a VIC adapter firmware 26 having a queue module 28. Queue module 28 can facilitate generating a VIC control message 30. A Unified Computing System Manager (USCM) 32, which includes a log module 34, may control a switch 36. Switch 36 may be provisioned with a Virtual InterFace (VIF) 37 that receives VIC control message 30, and a log policy enforcer 38. In various embodiments, log policy enforcer 38 may facilitate sending a syslog message 40 to a syslog server 42.

Certain terminologies are used with regard to the various embodiments of communication system 10. As used herein, the term "server" may include a physical or virtual computing device that can provide data and other services to various network elements. As used herein, the term "network element" can encompass computers, network appliances, servers, routers, switches, gateways, bridges, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

For purposes of illustrating the techniques of communication system 10, it is important to understand the communications in a given system such as the architecture shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In a typical data center network, a management software (e.g., UCSM 32) may reside in a fabric interconnect and control several chassis and respective servers and switches installed on the chassis. In general, the servers (e.g., blade servers or rack servers) may be equipped with VIC drivers that facilitate communication between the operating system (OS) of the server and VICs. VIC drivers typically include "network drivers" (e.g., software program that controls network communication between the VIC and the server) and "storage drivers" (e.g., software program that controls communication between the server and storage devices). The network driver and storage driver may log events into log messages, for example, and store them as log files in the server.

Events may be logged for various purposes, such as to provide information (e.g., information log, such as when a task completes successfully, e.g., network driver loads successfully), to warn the network administrator (e.g., to indicate possible occurrence of a future problem, such as data drop due to lack of buffer space), to indicate an error (e.g., invalid login attempt), etc. The log files may be generated in any suitable format, and may include relevant information such as type of event, date, time, source (e.g., system component, application, etc.), category, event ID, user, server identity, etc.

Typical VIC drivers store logging information on hard disks in the servers usually in the form of log files. The log files can be useful to application developers and data center administrators to debug driver issues seen on the servers. However, the typical VIC logging setup has numerous disadvantages. For example, it is common to have datacenter deployments where OS or hypervisors from different vendors co-exist on large number of deployed virtual machines. The datacenter administrator may find it difficult and inefficient to examine logs from several servers to debug an issue. If the server crashes and does not recover, the logs stored by the associated VIC driver are lost and cannot be recovered. If the server reboots continuously because of a bug in the VIC driver, the logs stored on the server cannot be helpful to debug the problem. Because driver logs are stored on hard disks by the storage drivers, problems with the storage drivers can result in inaccurate logs.

Communication system 10 is configured to address these issues (and others) in offering a system and method for hardware-based learning of Internet Protocol (IP) addresses in a network environment. According to embodiments of communication system 10, VIC driver 14 running on server 12 may identify an event to be logged. VIC driver 14 may generate log message 22 concerning the event. In various embodiments, log message 22 may be structured in a well-defined (predetermined) format and passed to VIC adapter firmware 26 running on VIC 24. VIC adapter firmware 26 can create a staging queue based on a log policy, which may be associated with a service profile or a port profile (or both) of server 12. As used herein, the term "log policy" can encompass a software definition of a rule to log events, and can contain information of a syslog server such as IP address and user credentials if any, type of events to be logged, and other information as described herein.

The term "service profile" can encompass a software definition of a server (e.g., servers 12), including its storage and network characteristics and configuration settings. The service profile may include configuration information for VICs (e.g., VIC 24), host bus adapters, and other devices. The service profile may define applicable resources (e.g., a specific server), identity information (e.g., Media Access Control (MAC) address for VICs), firmware revision specifications, and connectivity definitions (e.g., used to configure network adapters, fabric extenders and interconnects). The term "port profile" can include a software definition of an interface (e.g., virtual interface) on the server, including configuration settings and other port characteristics, such as access control lists, capability (e.g., uplink, L3 control), channel-group, description, name, NetFlow settings, port security, private virtual local area network (VLAN) configuration, Quality of Service (QoS) policy, etc.

Queue module 28 in VIC adapter firmware 26 can copy log message 22 from VIC driver 14 to the staging queue, generate VIC control message 30, which includes information from log message 22, and send VIC control message 30 to switch 36. In various embodiments, VIC adapter firmware 26 may tag log information with an identifier of the sender. For example, log message 22 from network driver 16 may be tagged with a virtual network interface card (vNIC) identifier; log message 22 from storage driver 18 may be tagged with a virtual Host Bus Adapter (vHBA) identifier. VIC adapter firmware 26 may create VIC control message 30 according to VIC protocols. Data Center Bridging eXchange (DCBX) protocols may be used to negotiate parameters of the VIC protocol between VIC adapter firmware 26 and switch 36. VIC control message 30 may contain the log sent by VIC driver 14 and also the associated vNIC ID/vHBA ID. VIC adapter firmware 26 may forward VIC control message 30 to switch 36.

In various embodiments, switch 36 may reformat VIC control message 30 to include server identification (e.g., server name, server location, etc.) and other suitable information. The reformatted message may be sent via syslog protocol in a syslog message 40 to preconfigured syslog server 42. Syslog server 42 may store similar messages from substantially all servers in network 11. Syslog protocol may use the User Datagram Protocol (UDP), port 514, for communication. Being a connectionless protocol, UDP may not provide acknowledgments. Additionally, at the application layer, syslog server 42 may not send acknowledgments back to switch 36 for receipt of syslog message 40. In various embodiments, and substantially according to syslog protocol, syslog message 40 may include information including facility (e.g., source type that generated the message, such as kernel, user-level, mail system, system daemons, etc.), severity, hostname, timestamp, and message. According to various embodiments, syslog message 40 may also include the vNIC/vHBA identifier.

The framework described herein may provide a unified solution to store and retrieve logs on a central server (e.g., syslog server 42) in network 11. The developers or system administrators can have a single point of contact for examining the logs of substantially all servers in network 11. Embodiments of communication system 10 can have various advantages. A centralized logging system across different OS and hypervisors may be provided, facilitating improved troubleshooting of driver related issues as system administrators need not access individual servers. There is no fear of losing the driver logs in the event of system crash or data corruption. It is easy to debug driver and configuration issues that cause OS installation to fail, as the related logs can be retrieved from a remote syslog server.

Turning to the infrastructure of communication system 10, the network architecture can include any number of servers, virtual machines, switches, routers, and other nodes inter-connected to form a large and complex network 12. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the architecture shown in FIG. 1 is simplified for ease of illustration. For example, network 11 may comprise access switches, aggregation switches, core switches to aggregate and distribute ingress (upstream traffic), and egress (downstream traffic) traffic, etc.

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

According to various embodiments, UCSM 32 may be a management application running on switch 36 (or remotely controlling switch 36). Switch 36 can be a Fabric Interconnect configured in Network Interface Virtualization (NIV) mode. In the NIV mode, VIC 24 may request multiple logical vNIC interfaces from switch 36 to carry traffic from several network endpoints. Different network endpoints can be bound to the same or different virtual machines (VMs) and communicate via respective vNICs. Each vNIC instance on VIC 24 may be represented by corresponding VIF 37 on switch 36. Network policy enforcement and forwarding decisions may occur at VIF 37. According to various embodiments, Virtual Interface Control protocol (VIC protocol) running between VIC 24 and switch 36 may be used to program virtual interface attributes and control its behavior on VIC 24 through appropriate VIC control messages (e.g., VIC control message 30) having suitable Type-Length-Values (TLVs).

In some embodiments, VIC 24 may include virtualization-optimized Fibre Channel over Ethernet mezzanine cards designed for use with blade and rack servers. For example, VIC 24 can include a dual-port 10 Gigabit Ethernet mezzanine card that supports several (e.g., up to 128/256) Peripheral Component Interconnect Express standards-compliant virtual interfaces that can be dynamically configured so that NIC corresponding to network driver 14 and HBA corresponding to storage driver 18 can be provisioned appropriately. In other embodiments, VIC 24 may be a virtual instance of a physical interface card including a virtual network interface card (vNIC) and a virtual host bus adapter (vHBA). In some embodiments, VIC driver 14 may include virtualized drivers within a virtual machine.

VIC adapter firmware 26 may include a combination of persistent memory and program code and data stored therein for facilitating the operations described in this Specification. In various embodiments, VIC adapter firmware 26 may be integrally provisioned within VIC 24. Syslog server 42 can be a server running the syslog protocol. In other embodiments, syslog server 42 may be an event message collector.

Although the embodiment illustrated in FIG. 1 includes merely one of each element shown therein, it may be understood that any number of elements may be included in communication system 10 within the broad scope of the embodiments. For example, server 12 may include multiple VIC drivers, a plurality of which may be associated with a one or more VICs. Each network driver 16 and storage driver 18 of each VIC driver 14 may send separate log message 22 to VIC 24. VIC 24 may include appropriate hardware and software to enable tracking log message 22 and associating it with the respective VIC driver 14.

Figure 2:
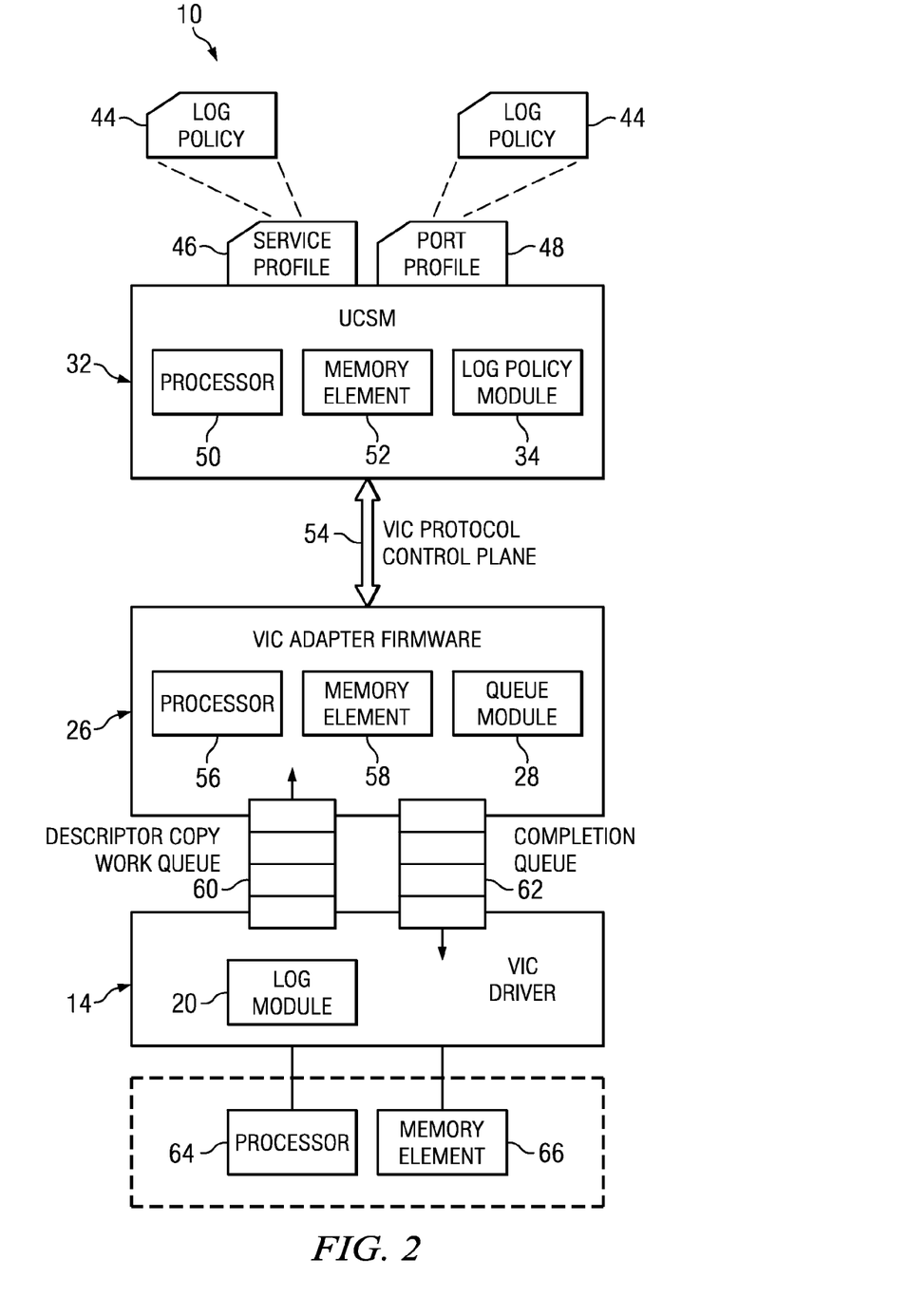
FIG. 2 is a simplified block diagram illustrating example details of another embodiment of the communication system.

Turning to FIG. 2, FIG. 2 is a simplified block diagram illustrating example details of an embodiment of communication system 10. In some embodiments, a user (e.g., network administrator) may create a log policy 44 on UCSM 32. Log policy 44 may include information of syslog server 42, such as IP address and user credentials if any. Log policy 44 may also specify a log level and associated event types to be logged. By way of examples, and not as limitations, the log levels can include CRITICAL, WARNING, INFO and VERBOSE. The user may associate log policy 44 with desired vNIC/vHBA identifiers, at which the logging may be performed. In various embodiments, log policy module 34 in UCSM 32 may include, or associate, log policy 44 with a service profile 46 and/or a port profile 48. UCSM 32 may include a processor 50 and a memory element 52 for facilitating operations described herein.

In various embodiments, UCSM 32 may communicate log policy 44 with VIC adapter firmware 26 via a VIC protocol control plane 54. In a general sense, the VIC protocol can enable provisioning and managing virtual interfaces on a remote device (such as server 12). In a typical configuration, when the VIC protocol connectivity is established, the VIC adapter firmware 26 may request that switch 36 create VIF 37 for each vNIC that is configured on VIC adapter firmware 26. VIC adapter firmware 26 may also pass certain attributes (e.g., port profile name, channel number, active/standby status). Switch 36 may respond by creating VIF 37 for each vNIC on VIC adapter firmware 26 and associating the port-profile and channel number to VIF 37. In various embodiments, messages communicated in VIC protocol control plane 54 may be according to the VIC protocol.

According to various embodiments, VIC adapter firmware 26 may include a processor 56, a memory element 58, and queue module 28. Queue module 28 may facilitate creating work queues for transferring control information and data between switch 36 and server 12. Work queues typically include information related to one or more network events such as send/receive messages from other servers in network 11. A typical work queue may include, for example, a received message, a message to be transmitted, a Direct Memory Access (DMA) descriptor (e.g., data structure), etc. VIC adapter firmware 26 may generally process the work queues, for example, sending out messages to be transmitted. For logging purposes, VIC driver 14 may use a descriptor copy work queue 60 that may not be processed by VIC adapter firmware 26 as a regular work queue. As used herein, the term "descriptor copy work queue" can include a list of log messages stored in a memory space within a memory element. In various embodiments, queue module 28 in VIC adapter firmware 26 may facilitate creating descriptor copy work queue 60 during provisioning of network driver 16 and storage driver 18 according to log policy 44.

Queue module 28 may facilitate creating a completion queue 62 for completion notification. As used herein, the term "completion queue" can include a list of completed tasks in a queue format stored in a memory space within a memory element (e.g., of server 12). Completion queue 62 may reflect a completion status of tasks in descriptor copy work queue 60. Depending on the operating system, completion queue 62 may send and receive requests through appropriate registered input/output extensions and suitable descriptors. In various embodiments, queue module 28 may associate each entry in descriptor copy work queue 60 with a corresponding entry in completion queue 62.

Log module 20 in VIC driver 14 may configure and initialize descriptor copy work queue 60 and completion queue 62. Log module 20 may also identify a specific log format to be used, for example, based on log policy 44 associated with respective network driver 16 and storage driver 18. VIC driver 14 may access a processor 64 and a memory module 66 to perform the operations described herein. In various embodiments, processor 64 and memory module 66 may belong to server 12, in which VIC driver 14 may be provisioned.

According to various embodiments, VIC adapter firmware 26 may retrieve descriptors from descriptor copy work queue 60, each of the descriptors identifying a respective data buffer in memory element 66, transfer data between memory element 58 in VIC adapter firmware 26 and the data buffers identified by the descriptors in descriptor copy work queue 60 and write appropriate transfer completion event descriptors into completion queue 62. Each of the transfer completion event descriptors may notify VIC driver 14 of completion of the transfer of data. For example, completion queue 62 may have an interrupt associated with it. The interrupt may be generated when VIC adapter firmware 26 writes to completion queue 62.

Figure 3:
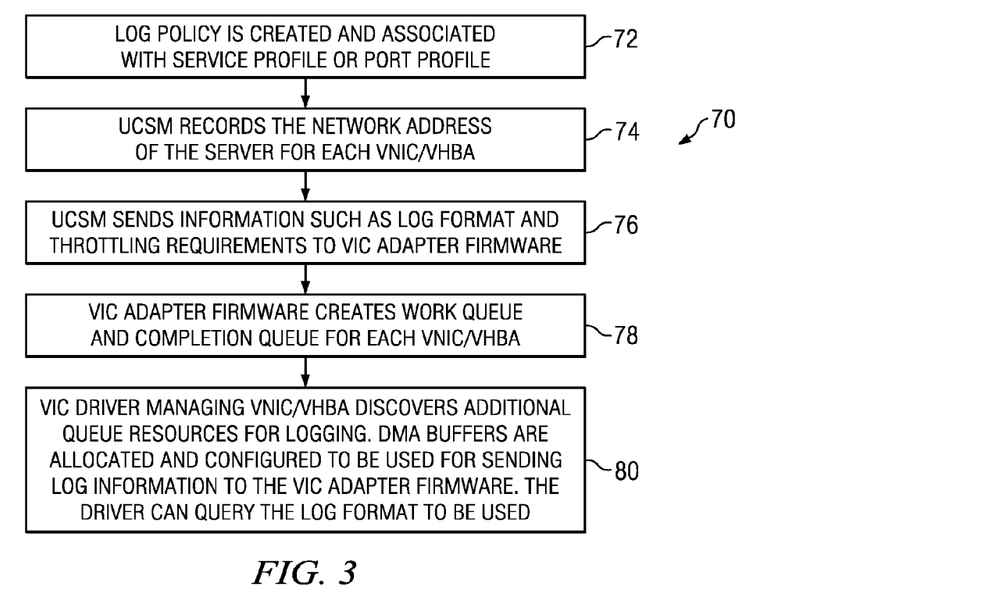
FIG. 3 is a simplified flow diagram illustrating example operations that may be associated with an embodiment of the communication system.

Turning to FIG. 3, FIG. 3 is a simplified flow diagram illustrating example operations that may be associated with an embodiment of communication system 10. Operations 70 include 72, at which log policy 44 is created and associated with service profile 46 or port profile 48. At 74, UCSM 32 may record the network address of server 12 for each vNIC/vHBA. At 76, UCSM 32 may send information such as log format and throttling requirements to VIC adapter firmware 26. At 78, VIC adapter firmware may create work queue 60 and completion queue 62 for each vNIC/vBHA. At 80, VIC driver 14 managing the vNIC/vHBA may discover additional queue resources for logging. Direct Memory Access (DMA) buffers may be allocated and configured to be used for sending log information to VIC adapter firmware 26. VIC driver 14 can query the log format to be used, for example, based on log policy 44.

Figure 4:
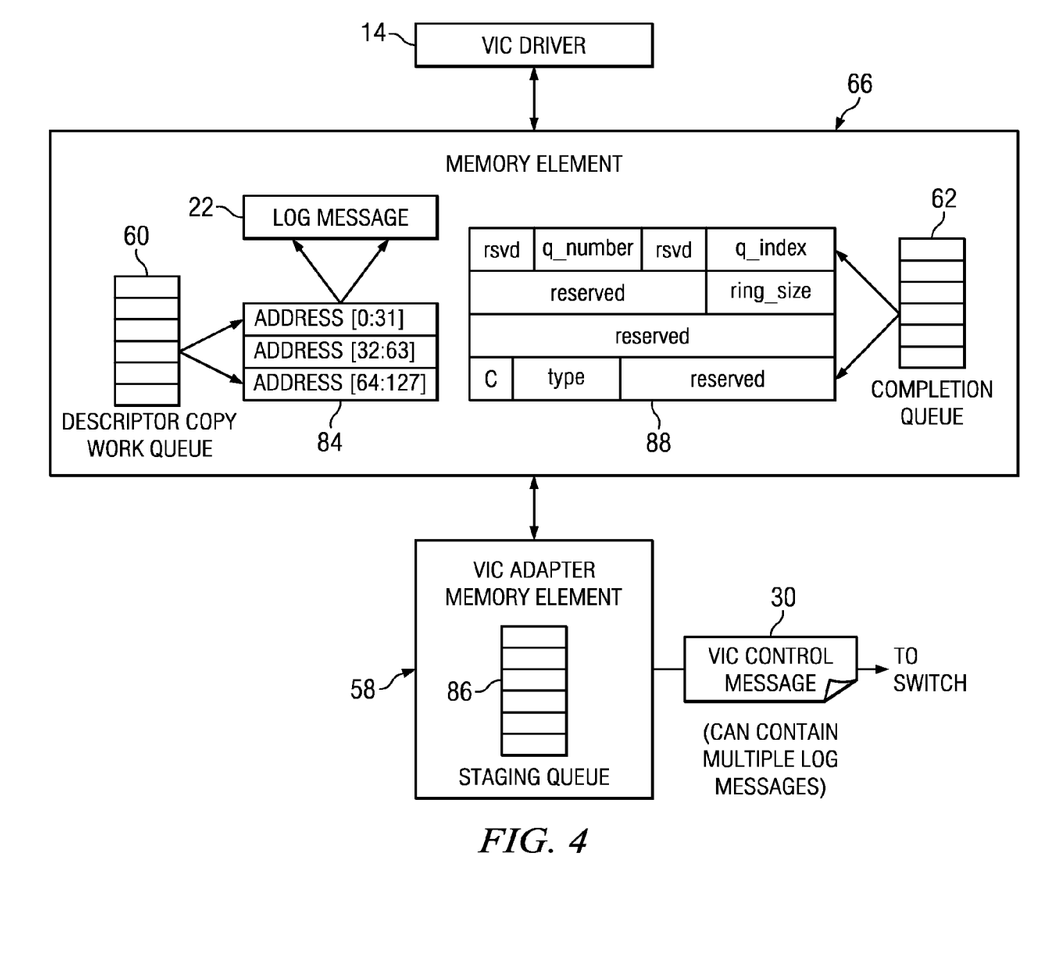
FIG. 4 is a simplified block diagram illustrating other example details of an embodiment of the communication system.

Turning to FIG. 4, FIG. 4 is a simplified block diagram illustrating example details of an embodiment of communication system 10. In a specific embodiment, VIC driver 14 and VIC adapter firmware 26 may use DMA memory mapped structures shared with server 14 to pass log and status information. The shared structures may reside in memory element 66 within server 12 and may be accessible to memory element 58 of VIC adapter firmware 26. VIC adapter firmware 26 may define descriptor copy work queue 60 and completion queue 62. For logging purposes, contents of descriptor copy work queue 60 may not be interpreted by VIC adapter hardware (e.g., processor) directly. When VIC driver 14 posts log message 22 to descriptor copy work queue 60, descriptor copy work queue 60 may be scheduled for service (e.g., as a result of a host write to a posted work index for descriptor copy work queue 60).

VIC driver 14 may detect an event to be logged and generate log message 22. A descriptor may be generated in descriptor copy work queue 60. The descriptor may point to data buffers 84, indicating the address in memory element 66 where log message 22 is stored. VIC adapter memory element 58 may copy the descriptor from data buffers 84 to a staging queue 86 in memory element 58. As used herein, the term "staging queue" can include a memory space (e.g., buffer) allocated in a memory element (e.g., of VIC adapter firmware 26) for storing data. In various embodiments, staging queue 86 may be a first-in-first-out queue. In other embodiments, staging queue 86 may store log message 22 on a per vNIC/vHBA identifier basis.

According to various embodiments, VIC driver 14 may advance a posted_index field of the descriptor when an entry is written to descriptor copy work queue 60. A descriptor fetch finite state machine (FSM) may fetch the descriptors beginning from a descriptor start (ring_base) in a target copy region of descriptor copy work queue 60 and write them to staging queue 86. The descriptor fetch FSM may continue to copy entries from descriptor copy work queue 60 to staging queue 86 until the end of a descriptor ring is reached (ring_size). After reaching ring_size, the descriptor fetch FSM may wrap back to ring_base.

In some embodiments, VIC adapter firmware 26 can copy contents of staging queue 86 to a flash memory. In other embodiments, VIC adapter firmware 26 can aggregate multiple log messages into VIC control message 30. In some embodiments, the log messages can be aggregated according to vNIC/vHBA ID. For example, VIC adapter firmware 26 can combine several log messages from the same vNIC ID into a single VIC control message 30. When VIC control message 30 has been formatted and sent, VIC adapter firmware 26 may post a completion queue entry 88 in completion queue 62, to inform VIC driver 14. As used herein, "completion queue entry" can include a data structure comprising information in a specific format.

The format of each completion queue entry 88 may depend on a type of completion queue event that created the entry. In various embodiments, the completion queue type may be encoded in a beginning of each completion queue entry 88 such that appropriate software can decode the various fields and sizes in each completion queue entry 88. For example, a 7-bit type field with a value of 1 may indicate a descriptor copy entry having 16 bytes. Each completion queue entry type can have a unique size and entry format. In some embodiments, each completion queue 62 may define its own type and format of entries. Moreover, substantially all completion queue entries (e.g., completion queue entry 88) written to a single completion queue (e.g., completion queue 62) need not be of the same type or format, whereas they may be of the same size. Completion queue entry formats written by VIC adapter firmware 26 may be defined by VIC adapter firmware 26 with the entry type and size being specified by a firmware/software interface. Virtually any suitable format may be provided for completion queue entry 88 within the broad scope of the embodiments.

In some embodiments, VIC driver 14 may be interrupted to notify about the transmission of log message 22. Each completion queue 62 may have a unique set of control registers that may even exist on a per vNIC/vHBA basis. The control registers may enable interrupt assertion after each completion queue entry 88 is written to completion queue 62. The interrupt may be sent to VIC driver 14 to notify of the task completion.

In various embodiments, VIC adapter firmware 26 may use VIC protocol to package the log information into VIC control message 30 and a TLV structure before forwarding to switch 36. The VIC protocol runs on control channel VIF that has been negotiated using a DCBX protocol. The VIC protocol is a request-response protocol; if a particular request or response message is lost in transit, then the original requestor may reissue the request message. Each response message for a particular request may have a Message-ID set from a message header of the original request message. Each VIC protocol data unit (PDU) may be composed of a PDU header followed by a message header and payload. The PDU header can include a version number, total length of PDU and MAC address of the VIC peer that the PDU is addressed to. The message header may be followed by a set of TLVs specific to the type of the message. According to various embodiments, a message type, VIF_LOG and a TLV, TLV_LOG_MESSAGE, may be defined for packaging and forwarding driver log message 22 in VIC control message 30. In various embodiments, the size of each log message 22 sent by VIC driver 14 can be up to 256 bytes. VIC adapter firmware 26 can combine several log messages from the same vNIC into a single VIC control message 30 as one PDU. VIC adapter firmware 26 may not modify the contents of the log information.

Figure 5:
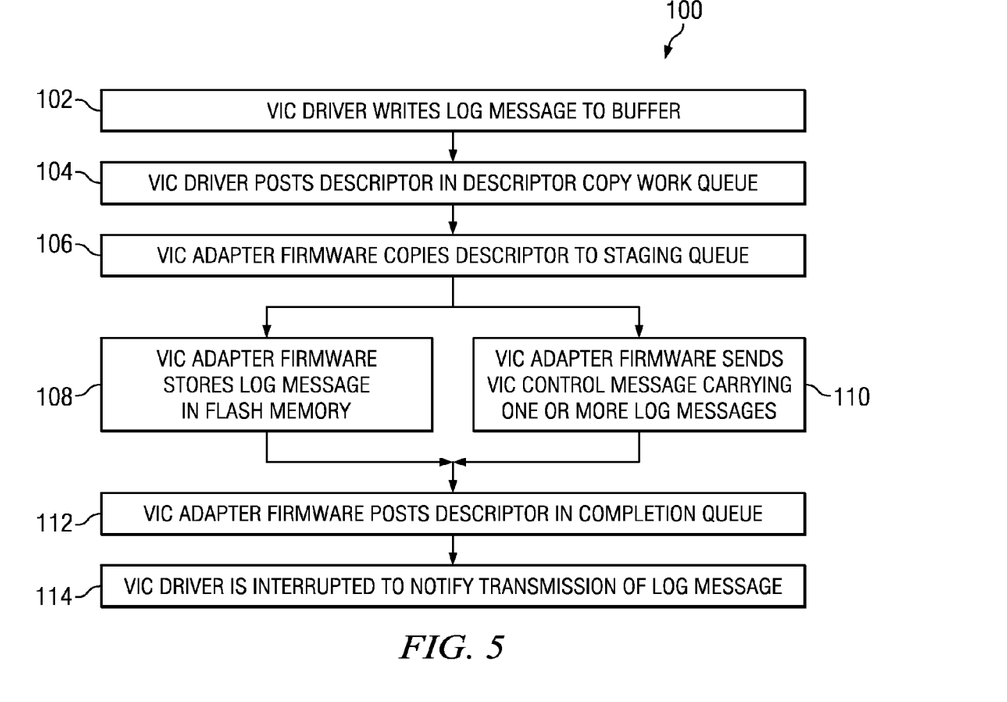
FIG. 5 is a simplified flow diagram illustrating other example operations that may be associated with an embodiment of the communication system.

Turning to FIG. 5, FIG. 5 is a simplified flow diagram illustrating example operations that may be associated with embodiments of communication system 10. Operations 100 may include 102, at which VIC driver 14 writes log message 22 to a buffer in memory element 66. At 104, VIC driver 14 may post a descriptor in descriptor copy work queue 60. The descriptor may identify data buffers 84 in memory element 66. VIC adapter firmware 26 may copy the descriptor from data buffers 84 to staging queue 86 at 106. At 108, VIC adapter firmware 26 may store log message 22 in flash memory (e.g., memory element 58). Alternatively, at 110, VIC adapter firmware 26 may send VIC control message 30 to switch 36 carrying one or more log messages, including log message 22. At 112, VIC adapter firmware 26 may post a transfer completion event descriptor 88 in completion queue 62. At 114, VIC driver 14 may be interrupted to notify about transmission of log message 22.

Figure 6:
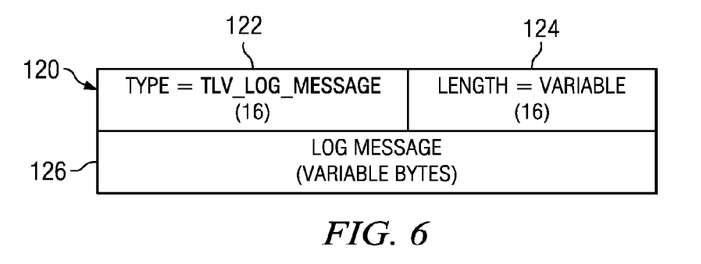
FIG. 6 is a simplified diagram illustrating example details of an embodiment of the communication system.

Turning to FIG. 6, FIG. 6 is a simplified diagram illustrating an example message type for VIC control message 30. Message type VIF_LOG 120 may include TLV 122 (TLV_LOG_MESSAGE) comprising 16 bits (2 bytes), a length field 124 of 16 bits (2 bytes), and a log message field 126, which may include log message 22, in variable number of bytes. Switch 36, upon receiving message type 120 may initiate log policy enforcer 38 for taking appropriate action based on log message 22.

Figure 7:
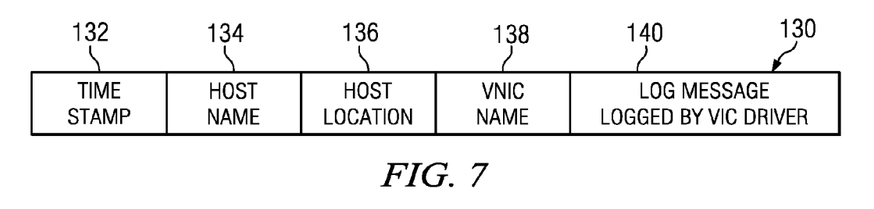
FIG. 7 is a simplified diagram illustrating example details of an embodiment of the communication system.

Turning to FIG. 7, FIG. 7 is a simplified diagram illustrating an example format for syslog message 40. Switch 36 may process VIC control message 30 and takes appropriate action. When switch 36 receives log message 22 from a particular vNIC instantiated on remote server 12, information about the server (or virtual machine), user friendly vNIC ID and timestamp may be added to syslog message 40. The updated log message is sent to syslog server 40. The information about syslog server may be derived from log policy 44.

An example format 130 may include a time stamp field 132, a host name field 134, a host location field 136, a vNIC name field 138, and a log message field 140. Time stamp field 132 may indicate a time at which log message 22 was received by switch 36. Host name field 134 may indicate a server name of server 12. Host location field 136 may indicate a location (e.g., an IP or MAC address) of server 12. vNIC name field 138 may indicate a VIC name (e.g., vNIC/vHBA ID or name of VIC driver 14) corresponding to the source that originated log message 22. Log message field 140 may indicate contents of log message 22.

Figure 8A:
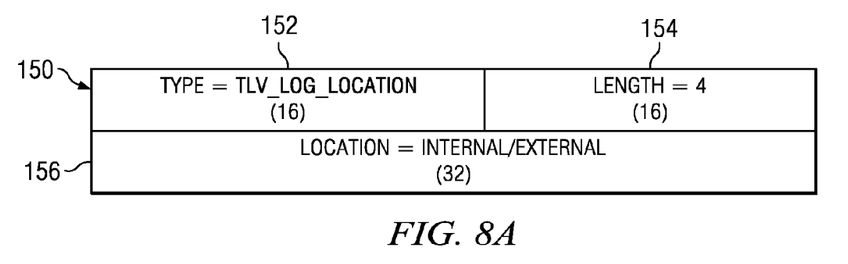
FIG. 8A is a simplified diagram illustrating other example details of an embodiment of the communication system.
Figure 8B:
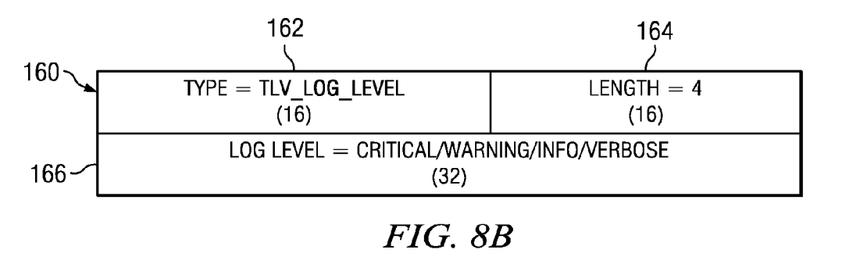
FIG. 8B is a simplified diagram illustrating yet other example details of an embodiment of the communication system.
Figure 8C:
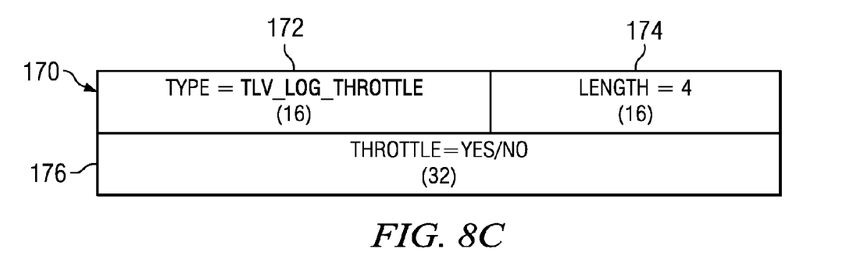
FIG. 8C is a simplified diagram illustrating yet other example details of an embodiment of the communication system.

Turning to FIGS. 8A-8C, FIGS. 8A-8C are simplified diagrams illustrating update messages to update log policy 44 according to an example embodiment. Log policy 44 may include various parameters, including throttling rate. Throttling of log messages may avoid flooding of VIC protocol control messages on the uplinks to switch 36. VIC adapter firmware 26 may be responsible for enforcing the throttling of log messages. Log policy 44 may be updated (or modified) periodically, or on an as-needed basis. The modification of parameters in log policy 44 may reflect in the logging behavior of VIC driver 14 and VIC adapter firmware 26 without having to reboot server 12. According to embodiments of communication system 10, the updated parameters in log policy 44 may be encapsulated in a VIC control message 30 and sent across from switch 36 (and UCSM 32) to VIC adapter firmware 26.

According to FIG. 8A, an example update message 150 may include a VIC message type, VIF_LOG_UPDATE to carry log policy modifications. A set of TLVs for message 150 may include type field 152 being TLV_LOG_LOCATION with a corresponding length field 154 being 4. Location field 156 may be an internal or external location of syslog server 42. Location field 156 may include an IP address and login credential of an external syslog server 42. If location field 156 indicates that syslog server 42 is internal, log message 22 may be stored in a flash memory of VIC adapter firmware 26.

According to FIG. 8B, an example update message 160 may include a type field 162 being TLV_LOG_LEVEL having length field 164 being 4 and a log level field 166 being one of example choices "critical," "warning," "info," and "verbose." For example, a specific log level may be changed from verbose to critical in a log policy update. When log level is "critical," VIC driver 14 may log only those events that can be fatal and result in failure of components of communication system 10. A log level of "warning" may indicate that VIC driver 14 logs non-fatal events that can result in undesirable behavior. A log level of "info" may indicate that VIC driver 14 provides asynchronous notification of user actions. A log level of "verbose" may be typically used for debugging, including logging all driver events and actions.

According to FIG. 8C, an example update message 170 may include a type field 172 being TLV_LOG_THROTTLE having length field 174 being 4 and a throttle field 176 being one of example choices "yes," and "no." A throttle of "yes" may indicate that the log message rate may be throttled by VIC adapter firmware 26. When log messages are throttled, they may be aggregated at VIC adapter firmware 26 (e.g., stored in a flash memory at VIC adapter firmware 26), without passing on to switch 36. A throttle of "no" may indicate that the log message may be sent to switch 36 as soon as it is received by VIC adapter firmware 26 from VIC driver 14.

Figure 9:
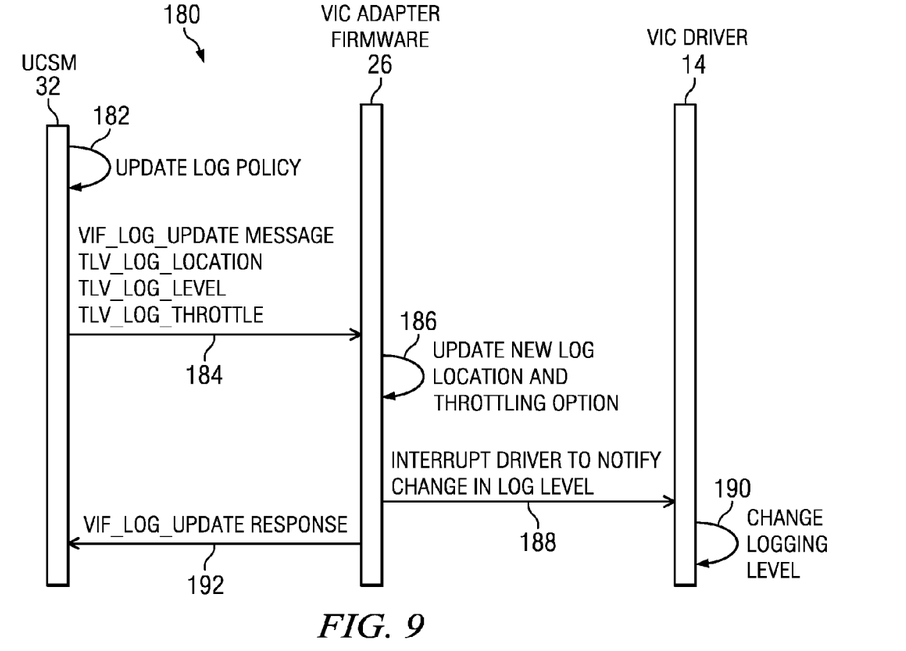
FIG. 9 is a simplified sequence diagram illustrating example operations that may be associated with an embodiment of the communication system.

Turning to FIG. 9, FIG. 9 is a sequence diagram illustrating example operations that may be associated with an embodiment of communication system 10. UCSM 32 may initiate a log policy update at 182. At 184, an update message including location of syslog server 42, log level, and throttling option may be sent to VIC adapter firmware 26. At 186, VIC adapter firmware 26 may update new log location, and throttling option. At 188, VIC adapter firmware 26 may interrupt VIC driver 14 to notify about change in the log level. At 190, VIC driver 14 may change the logging level. At 192, VIC adapter firmware 26 may send an update response (VOF_LOG_UPDATE) to UCSM 32. Thus, server 12 may not have to be rebooted to update the log level.

Figure 10:
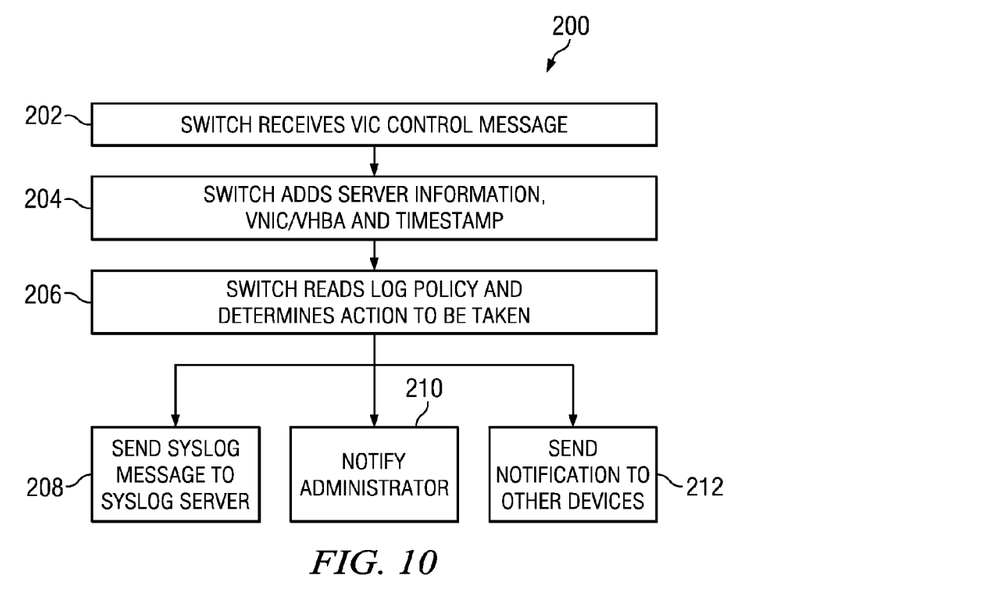
FIG. 10 is a simplified flow diagram illustrating example operations that may be associated with an embodiment of the communication system.

Turning to FIG. 10, FIG. 10 is a simplified flow diagram illustrating example operations that may be associated with an embodiment of communication system 10. Operations 200 may include 202, a which switch 36 may receive VIC control message 30 from VIC adapter firmware 26. At 204, switch 36 may add server information (e.g., server name, server location), vNIC/vHBA ID, and timestamp to VIC control message 30. At 206, log policy enforcer 38 in switch 36 may read log policy 44 and determine one or more suitable actions to be taken. Examples of the actions include 208, at which syslog message 40 may be sent to syslog server 42; 210, at which an administrator may be notified; and 212, at which notification may be sent to other devices on network 11.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, VIC adapter firmware 26. In some embodiments, one or more of these features may be implemented in hardware, provided external to these elements, or consolidated in any appropriate manner to achieve the intended functionality. The various network elements (e.g., server 12) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, VIC adapter firmware 26 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements (e.g., memory elements 52, 58, 66) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processors 50, 56, 64) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory elements 52, 58, 66) for storing information to be used in achieving operations as outlined herein. These devices may further keep information in any suitable type of non-transitory storage medium (e.g., random access memory (RAM), read only memory (ROM), field programmable gate array (FPGA), EPROM, EEPROM, etc.), software, hardware, or in any other suitable component, device, element, or object where appropriate and based on particular needs. The information being tracked, sent, received, or stored in a communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   generating a staging queue in a virtual interface card (VIC) adapter firmware of a server in a datacenter based on a log policy comprising one or more rules to record events, wherein the VIC adapter firmware is provisioned within a VIC in the server, wherein the VIC adapter firmware comprises persistent memory storing program code and data enabling network connectivity for the server over a network interface in the VIC, wherein the staging queue is generated in a first memory element;
   receiving, at the VIC adapter firmware, a log message from a VIC driver in the server associated with the network interface, the log message comprising information about an event in the server, the VIC driver comprising particularized software enabling communication between the VIC and an operating system of the server, wherein the VIC driver generates the log message and posts the log message in a descriptor copy work queue of a second memory element, wherein the second memory element is separate from the first memory element;
   copying the log message from the descriptor copy work queue to the staging queue;
   tagging the log message with an identifier of the network interface;
   generating a VIC control message comprising the tagged log message from the staging queue; and
   sending the VIC control message to a switch, wherein the switch reformats the VIC control message to identify the server, wherein the switch sends the reformatted message to a preconfigured centralized syslog server that receives similar messages concerning other servers in the datacenter,
   wherein,
      the switch evaluates the log policy, determines an action to be taken based on the log message, and adds a server name to the log message, and
      the action is (a) sending a sysloq message to a sysloq server, (b) notifying an administrator, or (c) sending a notification to one or more devices.

2. The method of claim 1, wherein the log policy is associated with at least one of a service profile of the server and a port profile of a virtual interface instantiation on the server in a network environment.

3. The method of claim 1, wherein the log message is copied to the descriptor copy work queue at the VIC driver, and wherein the log message is copied to the staging queue from the descriptor copy work queue, wherein the descriptor work queue is not processed by the VIC adapter firmware as a regular work queue.

4. The method of claim 1, further comprising:
   posting a completion queue entry in a completion queue at the VIC driver; and
   interrupting the VIC driver to notify of transmission of the log message to the switch.

5. The method of claim 1, wherein the VIC control message includes a log message type, and a corresponding Type-Length-Value (TLV) according to a Virtual Interface Control protocol.

6. The method of claim 1, further comprising:
updating a log location, log level, and throttling option according to a log policy update; and
interrupting the VIC driver such that the VIC driver can change a logging level according to the log policy update.

7. The method of claim 6, wherein the log policy update is transmitted to the VIC adapter firmware in an update message comprising the log location, the log level, and the throttling option.

8. The method of claim 1, wherein the switch adds a server location, a VIC name, and a timestamp to the log message.

9. Non-transitory media encoding logic that includes instructions for execution and when executed by a processor, is operable to perform operations comprising:
generating a staging queue in a virtual interface card (VIC) adapter firmware of a server in a datacenter based on a log policy comprising one or more rules to record events, wherein the VIC adapter firmware is provisioned within a VIC in the server, wherein the VIC adapter firmware comprises persistent memory storing program code and data enabling network connectivity for the server over a network interface in the VIC, wherein the staging queue is generated in a first memory element;
receiving, at the VIC adapter firmware, a log message from a VIC driver in the server associated with the network interface, the log message comprising information about an event in the server, the VIC driver comprising particularized software enabling communication between the VIC and an operating system of the server, wherein the VIC driver generates the log message and posts the log message in a descriptor copy work queue of a second memory element, wherein the second memory element is separate from the first memory element;
copying the log message from the descriptor copy work queue to the staging queue;
tagging the log message with an identifier of the network interface;
generating a VIC control message comprising the tagged log message from the staging queue;
sending the VIC control message to a switch, wherein the switch reformats the VIC control message to identify the server, wherein the switch sends the reformatted message to a preconfigured centralized syslog server;
updating a log location, log level, and throttling option according to a log policy update; and
interrupting the VIC driver such that the VIC driver can change a logging level according to the log policy update.

10. The media of claim 9, wherein the log policy is associated with at least one of a service profile of the server and a port profile of a virtual interface instantiation on the server in a network environment.

11. The media of claim 9, wherein the log message is copied to the descriptor copy work queue at the VIC driver, and wherein the log message is copied to the staging queue from the descriptor copy work queue, wherein the descriptor work queue is not processed by the VIC adapter firmware as a regular work queue.

12. The media of claim 9, the operations further comprising:
posting a completion queue entry in a completion queue at the VIC driver; and
interrupting the VIC driver to notify of transmission of the log message to the switch.

13. The media of claim 9, wherein the VIC control message includes a log message type, and a corresponding Type-Length-Value (TLV) according to a Virtual Interface Control protocol.

14. The media of claim 9, wherein the log policy update is transmitted to the VIC adapter firmware in an update message comprising the log location, the log level, and the throttling option.

15. An apparatus, comprising:
a memory element for storing data; and
a processor operable to execute instructions associated with the data, wherein the processor and the memory element cooperate, such that the apparatus is configured to:
generate a staging queue in a virtual interface card (VIC) adapter firmware of a server in a datacenter based on a log policy comprising one or more rules to record events, wherein the VIC adapter firmware is provisioned within a VIC in the server, wherein the VIC adapter firmware comprises persistent memory storing program code and data enabling network connectivity for the server over a network interface in the VIC, wherein the staging queue is generated in a first memory element;
receive, at the VIC adapter firmware, a log message from a VIC driver in the server associated with the network interface, the log message comprising information about an event in the server, the VIC driver comprising particularized software enabling communication between the VIC and an operating system of the server, wherein the VIC driver generates the log message and posts the log message in a descriptor copy work queue of a second memory element, wherein the second memory element is separate from the first memory element;
copy the log message from the descriptor copy work queue to the staging queue;
tag the log message with an identifier of the network interface;
generate a VIC control message comprising the tagged log message from the staging queue; and
send the VIC control message to a switch, wherein the switch reformats the VIC control message to identify the server, wherein the switch sends the reformatted message to a preconfigured centralized syslog server that receives similar messages concerning other servers in the datacenter, wherein the switch evaluates the log policy and determines an action to be taken based on the log message, and wherein the action is (a) sending a sysloq message to a sysloq server, (b) notifying an administrator, or (c) sending a notification to one or more devices.

16. The apparatus of claim 15, wherein the log policy is associated with at least one of a service profile of the server and a port profile of a virtual interface instantiation on the server in a network environment.

17. The apparatus of claim 15, wherein the log message is copied to the descriptor copy work queue at the VIC driver, and wherein the log message is copied to the staging queue from the descriptor copy work queue, wherein the descriptor work queue is not processed by the VIC adapter firmware as a regular work queue.

18. The method of claim 1, wherein a log policy enforcer in the switch reads the log policy and determines the action to be taken.

19. The method of claim 1, wherein the action to be taken is sending the syslog message to the syslog server and sending the notification to a plurality of the devices.

20. The apparatus of claim 15, further comprising:
a log policy enforcer in the switch configured to read the log policy and determine the action to be taken,
wherein,
the action to be taken is sending the syslog message to the syslog server and sending the notification to a plurality of the devices.

\* \* \* \* \*